(12) United States Patent
Zaggl et al.

(10) Patent No.: US 12,302,965 B2
(45) Date of Patent: May 20, 2025

(54) METHOD FOR MANUFACTURING A WATER VAPOR PERMEABLE OR BREATHABLE THREE-DIMENSIONAL GLOVE OR GLOVE LINING

(71) Applicant: W. L. Gore & Associates GmbH, Putzbrunn (DE)

(72) Inventors: Alexander Zaggl, Aying (DE); Holger Zoudlik, Kolbermoor (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 17/700,169

(22) Filed: Mar. 21, 2022

(65) Prior Publication Data

US 2022/0279876 A1 Sep. 8, 2022

Related U.S. Application Data

(62) Division of application No. 16/313,626, filed as application No. PCT/EP2016/065036 on Jun. 28, 2016, now abandoned.

(51) Int. Cl.
*A41D 19/00* (2006.01)
*A41D 19/02* (2006.01)
(Continued)

(52) U.S. Cl.
CPC ....... *A41D 19/0006* (2013.01); *A41D 19/001* (2013.01); *A41D 19/02* (2013.01);
(Continued)

(58) Field of Classification Search
CPC .. A41D 19/02; A41D 19/001; A41D 19/0006; A41D 19/015; A41D 31/02; B32B 2307/7246; B32B 2307/02; B29C 44/1271
(Continued)

(56) References Cited

U.S. PATENT DOCUMENTS 3,869,726 A * 3/1975 Bell ............... A41D 19/001
  2/164
5,123,119 A * 6/1992 Dube ............. A41D 19/0006
  2/168

(Continued)

FOREIGN PATENT DOCUMENTS

JP H08-302509 A 11/1996
JP 10-18114 1/1998
(Continued)

*Primary Examiner* — Khaled Annis
*Assistant Examiner* — Dakota Marin
(74) *Attorney, Agent, or Firm* — GREENBERG TRAURIG, LLP

(57) ABSTRACT

A method for manufacturing a water vapor permeable glove or a glove lining. The method includes steps: (A) preparing a functional layer assembly in the shape of a hand having a hand insertion opening and having a flat configuration, the flat functional layer assembly being stretchable in at least one direction, (B) subjecting the flat functional layer assembly to a stretching force and thereby transforming the flat configuration into a three-dimensional structure under the influence of the stretching force, (C) applying heat to the functional layer assembly while the functional layer assembly is subject to the stretching force, thereby relaxing the functional layer assembly and transforming the three-dimensional structure of the functional layer assembly into a stable three-dimensional structure, and (D) removing the stretching force from the functional layer assembly.

15 Claims, 9 Drawing Sheets

(51) Int. Cl.
*A41D 31/102* (2019.01)
*A41D 19/015* (2006.01)
*B29C 44/12* (2006.01)

(52) U.S. Cl.
CPC .......... *A41D 31/102* (2019.02); *A41D 19/015* (2013.01); *B29C 44/1271* (2013.01); *B32B 2307/7246* (2013.01); *B32B 2437/02* (2013.01)

(58) Field of Classification Search
USPC .......................................................... 2/169
See application file for complete search history.

(56) References Cited

U.S. PATENT DOCUMENTS

| | | | | |
|---|---|---|---|---|
| 5,740,551 A * | 4/1998 | Walker | ................ | A41D 31/102 2/167 |
| 5,766,400 A * | 6/1998 | Gallagher, Jr. | ..... | B29C 66/1122 156/251 |
| 6,154,886 A * | 12/2000 | Hottner | ................ | A41D 19/02 2/167 |
| 6,829,802 B2 * | 12/2004 | McKenzie | ............. | A47L 13/18 15/210.1 |
| 7,162,748 B2 * | 1/2007 | Hottner | ................ | A41D 19/015 442/289 |
| 7,284,283 B2 * | 10/2007 | Mack | .................. | A41D 27/245 2/161.6 |
| 7,451,497 B2 * | 11/2008 | von Blüher | .......... | A41D 19/015 442/122 |
| 2007/0000021 A1 * | 1/2007 | Yang | .................. | A41D 19/0006 2/161.6 |
| 2007/0083980 A1 * | 4/2007 | Yang | .................. | A41D 19/0068 2/167 |
| 2008/0263738 A1 * | 10/2008 | Shamis | ............ | A41D 19/01523 2/164 |
| 2012/0060258 A1 * | 3/2012 | Stewart | ................... | B32B 5/022 2/206 |
| 2012/0185997 A1 * | 7/2012 | Kirk, II | ................ | A62B 17/006 2/161.7 |
| 2013/0139294 A1 * | 6/2013 | Zetune | .................. | A61B 42/00 2/163 |
| 2013/0232662 A1 * | 9/2013 | Williams | ............... | A41D 27/24 2/164 |
| 2013/0305430 A1 | 11/2013 | Tomono | | |
| 2015/0056102 A1 * | 2/2015 | Yamada | ................ | B01D 39/16 422/120 |
| 2016/0044980 A1 * | 2/2016 | Greenacre | ................ | A41D 1/06 2/243.1 |
| 2022/0088287 A1 * | 3/2022 | Haces | ................... | A61M 35/30 |

FOREIGN PATENT DOCUMENTS

| | | |
|---|---|---|
| JP | 2003/532802 A | 11/2003 |
| JP | 2008-214794 A | 9/2008 |
| WO | WO 01/56415 A2 | 8/2001 |

* cited by examiner

Prior Art

METHOD FOR MANUFACTURING A WATER VAPOR PERMEABLE OR BREATHABLE THREE-DIMENSIONAL GLOVE OR GLOVE LINING

RELATED APPLICATIONS

The present application is a divisional application of U.S. patent application Ser. No. 16/313,626, filed on Dec. 27, 2018, which is a national phase filing under 35 USC 371 of International Application No. PCT/EP2016/065036, filed on Jun. 28, 2016, the entire contents and disclosures of which are hereby incorporated by reference.

The present invention relates to a method for manufacturing a water vapor permeable or breathable three-dimensional glove or glove lining, and to a three-dimensional glove or glove lining.

When producing three-dimensional gloves or glove linings from essentially flat or two-dimensional fabrics or fabric pieces, these flat fabrics or fabric pieces have to be transformed into a three-dimensional shape. Usually, it is also desired that the three-dimensional glove or glove lining has an inherently stable three-dimensional shape, i.e. the glove or glove lining remains in its three-dimensional shape after the glove or glove lining is taken off. At least one essentially flat or two-dimensional fabric or two fabric pieces have to be transformed into a three-dimensional shape corresponding to a hand. Particularly, an inherently stable three-dimensional shape is desired that closely fits the shape of a user's hand when pulled on, but which does not recover to an essentially flat shape after the glove is taken off.

The manufacturing process is particularly difficult with respect to three-dimensional gloves or glove linings including a functional layer assembly comprising a functional layer or a functional laminate to provide water vapor permeable and at least windproof characteristics to the three-dimensional glove or glove lining, preferably even water vapor permeable and waterproof characteristics.

Known water vapor permeable and at least windproof, or even waterproof, laminates, e.g. WINDSTOPPER® or GORE-TEX® laminates as produced by W.L. Gore & Associates, have an essentially flat or two-dimensional configuration. Even in case such laminates have to some extent elastic or stretchable characteristics, it is difficult to transform such laminates into an inherently stable three-dimensional shape like the shape of a glove. WO 01/56415 A2 suggests producing a non-stretchable outer material assembly with a three-dimensional shape corresponding to a hand, as well as producing an essentially two-dimensional inner functional layer assembly having elastic characteristics. The inner functional layer assembly is stretched on a hand form such as to transform its essential two-dimensional configuration into a three-dimensional shape corresponding to the shape of the outer material assembly. The inner functional layer assembly is inserted into the outer material assembly and bonded to the inner face of the outer material assembly while under tension. The outer material assembly is made of a non-stretchable material which is capable of absorbing recovery forces of the inner functional laminate caused by the stretching of inner functional laminate. This method requires the presence of a non-stretchable three-dimensional outer material assembly, in order to absorb the recovery forces of the stretched inner functional laminate. It is not possible to produce such three-dimensional outer material assembly in only one or two pieces. Therefore, the three-dimensional outer material assembly of the three-dimensional glove inevitably has more than one seam and is complicated to manufacture. Particularly a lot of small parts connected by a complicated and exhausting sewing processes are needed, as shown in FIG. 1. This creates many seams which negatively affect fit, comfort, tactility and dexterity. Moreover, the large number of seams are hard to seal.

The present invention allows for a simpler method of manufacturing a three-dimensional glove or a glove lining. The method suggested herein particularly allows the manufacturing of a three-dimensional glove or a glove lining, without the need for a non-stretchable three-dimensional outer material assembly. Thereby, a glove or a glove lining can be produced requiring a single seam.

The present invention suggests a method for manufacturing a three-dimensional glove or a glove lining, comprising the steps:

(A) preparing a functional layer assembly having a flat configuration, the flat functional layer assembly being stretchable in at least one direction, (B) subjecting the flat functional layer assembly to a stretching force and thereby transforming the flat configuration into a three-dimensional structure under the influence of the stretching force, (C) applying heat to the functional layer assembly while the functional layer assembly is subject to the stretching force, thereby relaxing the functional layer assembly and transforming the three-dimensional structure of the functional layer assembly into an inherently stable three-dimensional structure, and (D) removing the stretching force from the functional layer assembly.

A functional layer assembly having a flat configuration or an essentially two-dimensional configuration has a sheet like configuration, and thus can be spread out on a flat surface. In a most simple configuration the functional layer assembly is comprised of a single sheet of material which can be spread out on a flat surface. In more complex configurations the functional layer assembly may have a configuration which allows spreading out of the functional layer assembly on a flat surface with two or more layers superimposed on each other. E.g. the functional layer assembly may have the configuration of two layers with the contour of a two-dimensional hand when superimposed onto each other. At least one the layers forming the superimposed layers of the two dimensional functional assembly comprises a functional material. For example, each of the superimposed layers forming the two dimensional functional layer assembly may comprise a functional material. However, in some embodiments it may be sufficient if only one, or some, of the superimposed layers forming the two dimensional functional layer assembly comprises a functional material. The other superimposed layer or layers may comprise any textile material or fabric, desirably a textile material or fabric providing stretchability in at least one direction.

The textile material may have the configuration of textile sheet materials or fabrics. Textile sheet materials or fabrics can be, for example, wovens, knits, nonwovens or felt. The material can be formed from natural fiber, for example cotton or viscose, or from synthetic fiber such as polyester, polyamides, polypropylene or polyolefins, or of blends of at least two of these materials. Such materials are normally water permeable and water vapor permeable. To render them water resistant they can be hydrophobicized by treating them with a water-repellent material in such a way that the pores of the material remain open for water vapor transport.

The textile materials or fabrics may be stretchable. This can be achieved by using stretchable or elastic fibers, such as those made from certain polyamides, e.g. polyamide 6.6 or nylon, polyurethane, or combinations thereof. Particularly useful are elastic or stretchable fibers comprising polyurethane block copolymers. Such block copolymers may comprise relatively hard polymer blocks, particularly polymer blocks comprising isocyanate groups, and relatively soft polymer blocks, particularly polymer blocks comprising polyalcohol groups (e.g. polyethylene glycol groups). In such block copolymers the relatively hard blocks have a straight configuration and bond to other hard blocks in an ordered configuration, thereby providing stability of the fiber. In between these relatively hard blocks relatively soft blocks are provided. The relatively soft blocks have a more unordered, clustering configuration than the relatively hard blocks. Therefore, when subject to a tensioning force, the relatively soft blocks tend to orient into the direction of the stretching force and tend to re-orient into an unordered configuration when the tensioning force is released. Thereby, the relatively soft blocks provide stretchability or elasticity of the fiber. The relatively soft blocks may be based on polyesters or polyethers. Stretchable fibers of such type are e.g. known as elastane, spandex, or rubber fibers, sold inter alia under the trade marks Lycra, or Dorlastan.

Stretchable characteristics can also be achieved for textile materials or fabrics by the way fibers are structured. Particularly, texturised fibers may be useful, e.g. crimped fibers. Texturisation is a process where the fibers are e.g. pulled over discs and are thereby curled or twisted. That way the fiber is actually longer in the textile, than it would otherwise be and can therefore be stretched. Such texturized fibers, even when made of a non-elastic material, provide elastic characteristics, since these fibers tend to recover from a stretched configuration to their original configuration after the tensioning force is released. One example may be crimped fibers which have a generally spiral configuration in the absence of a tensioning force. These crimped fibers elongate when subject to a tensioning force, but recover at least in part to their spiral configuration once the tensioning force is released.

A further way of providing stretchable characteristics to a textile material or fabric is by the way the fibers are bonded to each other. Particularly, knitting is a known technique to impart stretchable characteristics to textile materials or fabrics made from principally non-stretchable fibers.

Not all of the fibers or yarns in the textile material or fabric need to be elastic to make the textile material or fabric stretchable. Rather, stretchable textile materials or fabrics may be made up from mixtures of stretchable and non-stretchable yarns. Moreover, stretchable yarns made from stretchable and non-stretchable fibers may be used, e.g. yarns made of fiber up to 20% elastic polyurethane (Lycra) fibers and 80% or more non-elastic fibers, like polyamide fibers or polyester fibers.

The heat processing as specified in step (C) may be applied to any of the textiles or fabrics mentioned above. In fact, the heat processing is only required to provide a temperature close to, or even above, the ironing temperature of the textile material or fabrics. All fabrics, whether made from natural fibers or made from synthetic fibers, or made from compositions of natural and synthetic fibers, can be softened, dressed or formed when exposed to a particular elevated temperature, usually while applying pressure and/or using water vapor. This characteristic is usually used when subjecting a textile material or fabrics to ironing, and hence the temperature at which a textile material or fabrics may be softened, dressed, or formed is referred to as the ironing temperature. Particularly, all fibers made from synthetic materials have a temperature at which they start to soften. When the textile material or fabric is stretched and then heat is applied until a temperature in the range of the ironing temperature is reached, the material's microstructure changes. This happens whether the fibers are elastic, e.g. with polyurethane fibers or polyamide 6.6 (Nylon) fibers, or not, even if the elasticity of the textile material or fabrics is due to texturisation of the fibers or due to the type of bonding fibers to each other to form the textile structure, e.g. as a knit.

For synthetic fibers micro-Brownian motion of the macromolecules forming the fiber allows softening of the fiber when the temperature reaches the range of the glass transition temperature of the polymer, which may be e.g. 90° C. for polyamide 6.6, or 60-20° C. for the softer segments in polyurethane, or 80-110° C. for polyester. It has turned out that efficient transition from a flat configuration into a three dimensional configuration can be achieved if the temperature in step (C) is set to a temperature in a temperature range above the glass transition temperature, but still below the softening temperature of the polymer, i.e. a temperature where the polymer starts flowing. Such temperature range above the glass transition temperature and below the softening temperature is normally used when ironing a textile material or fabrics. For example a suitable temperature in step (C) is 150° C. for polyamide 6.6, 150-180° C. for polyurethane (elastane), or 150-200° C. for polyester.

The terms textile sheet material and fabric are used as synonyms herein. In particular, a textile sheet material or fabric, while made from fibers, may include additional non-fibrous components, e.g. coatings or additives.

Particularly, the functional layer assembly may be a unitary functional layer assembly. A unitary functional layer assembly has the configuration of a single piece of material. In case the functional layer assembly comprises a plurality of layers, all the layers forming the functional layer assembly are bonded together tightly, e.g. in the form of a functional laminate, to form a unitary functional layer assembly. For example, such unitary functional layer assembly may comprise a two- or more-layer laminate or an outer material layer bonded to a functional layer or to functional laminate on the outer side of the glove, and/or may comprise an insulating layer bonded to the functional layer or functional laminate on the inner side of the glove, i.e. the side facing the body.

The functional layer assembly may have the configuration of a laminate including at least one functional layer (e.g. a water vapor permeable and windproof membrane, or a water vapor permeable and waterproof membrane) and at least one textile layer attached to the at least one functional layer (e.g. laminates known as WINDSTOPPER® or GORE-TEX®, W.L. Gore & Associates). Particularly, the functional layer assembly may be a two layer laminate having a textile layer laminated to the functional layer on one side, or a three layer laminate having a textile layer laminated to each side of the functional layer. Other configurations of the functional assembly are conceivable as well, for example four layer laminates. Each of the textile layers may be a supporting layer or a backing layer. It also conceivable to add a textile layer having insulating characteristics.

The functional layer may be based on a number of functional materials, particularly based on expanded polytetrafluorethylene (ePTFE), polyurethane (PU), polyether ester (PES), polyethylene or combinations of these materials.

The functional layer assembly may be water vapor permeable and windproof, like laminates sold under the name WINDSTOPPER® by W.L Gore & Associates. Such functional layer assemblies usually are considered at least water resistant. In some embodiments, the functional layer assembly may be water vapor permeable and waterproof, like laminates sold under the name GORE-TEX® by W.L Gore & Associates. The functional layer can be any waterproof, water vapor permeable or breathable material such as a porous material (e.g. porous PU, or porous ePTFE), or non-porous material (e.g. non porous polyethylene, non-porous polyurethane). The functional layer can also have a more complex configuration, e.g. a combination of a porous material (like porous PU or porous ePTFE) and a hydrophilic material (like PU or PE). The hydrophilic material may form a coating on at least one side of the porous material and may also at least partly penetrate the pores of the porous material. The porous polytetrafluoroethylene is preferably expanded polytetrafluoroethylene prepared as described in U.S. Pat. No. 3,953,566 and preferably will have a hydrophilic coating of polyurethane that is nonporous but which transports water vapor molecules by molecular transportation. Such a combination is described in U.S. Pat. No. 4,194,041. This combination is adhered to an appropriate textile layer which serves to protect the porous polytetrafluoroethylene layer, thereby forming a functional layer assembly.

Water vapor permeability (WVP) as used herein concerning the functional layer or the functional laminate is tested and defined in EN ISO 15496 (2004), also known as the "Cup Test". A square 20×20 cm or circular Ø 100 mm sample of the functional laminate under investigation is placed onto a container containing water and covered with a water vapor permeable and waterproof functional layer. Then a cup containing sodium acetate and being covered by the same functional layer is placed on the sample. Water vapor passes through the functional laminate under investigation into the cup. The weight increase of the cup is then determined.

A functional layer or functional laminate may be considered waterproof in case a 100 cm$^2$ sample of the material under investigation is able to withstand a water ingress pressure of at least 0.05 bar. Particularly, the material may even withstand a water pressure of at least 1 bar. The method for carrying out this test is described in the ISO Standard No. 811 (1981). The measurement is carried out by exposing a 100 cm$^2$ sample of the material under investigation to a rising water pressure. For this purpose, distilled water having a temperature of 20±2° C. is used. The rise in the water pressure is 60±3 cm H$_2$O/min. The water ingress pressure of the sample under investigation is that pressure at which water passes through the opposite side of the sample under investigation. If a 100 cm$^2$ sample cannot be obtained, a smaller sample may be used for the measurement. There is a linear correlation between sample size and water ingress pressure, so that the water ingress pressure may be calculated for a 100 cm$^2$ sample.

Windproofness may be tested according to EN ISO 9237 (1995). Here the vertical air flow rate through a textile is measured at a certain pressure difference. The measurement is carried out by exposing a sample piece of the functional layer or laminate (e.g. the glove or glove lining) to an air flow orthogonally to the surface of the sample at a pressure difference of 100 hPa. A functional layer or functional laminate to be used for the glove or glove lining may be considered windproof if air passes through the functional layer or functional laminate at less than or equal to 10 l/min, preferably less than or equal to 5 l/min at the given pressure difference of 100 hPa.

The functional layer assembly is stretchable in at least one direction. Thereby, the functional layer assembly can be strained in the at least one direction under stress, i.e. when a stretching force is applied to the functional layer assembly in the at least one direction or into another direction. After removal of the stress or stretching force, the functional layer assembly recovers towards its original shape. Recovery may be complete recovery or a partial recovery. Recovery time may vary from immediate recovery after removal of stress to recovery over long timescales like several minutes or even hours. This characteristic of the functional layer assembly may also be referred to as "elasticity". Typically, stretchability of the functional layer assembly in at least one direction will be required, particularly in a direction perpendicular to the direction in which the glove or glove lining is pulled on/pulled off. Stretchability of the functional layer assembly in more than one direction is conceivable as well. For example, the functional layer assembly may have biaxially stretchable characteristics.

Step (C) refers to transforming the stretchable or elastic flat functional layer assembly into an inherently stable three-dimensional functional layer assembly. Being inherently stable the functional layer assembly, after having been subject to step (C), only partially recovers towards its original flat shape, or even no longer recovers to its original flat shape after removal of the stretching force. Particularly, after having been subject to step (C) the functional layer assembly does not show any significant recovery towards its original shape anymore, even after a relatively long timescale of one day, or more. This implies that the functional layer assembly does not significantly change its three-dimensional shape, after having been subject to step (C). Particularly, the functional layer assembly does not recover to its original flat shape, even in the absence of a three-dimensional supporting layer, like a three-dimensional outer material layer to which the functional layer assembly is joined.

The invention uses the principle of heat-induced stress relaxation in stretchable fabrics materials, particularly in stretchable polymer materials, like elastomers, in order to transform a flat functional layer assembly into an inherently stable three-dimensional shape of the functional layer assembly. Particularly, the invention makes use of the fact that stress relaxation can be boosted by application of heat, particularly in textile materials or fabrics comprising polymer materials. By applying heat to the stretched functional layer assembly in step (C), stress imparted to the functional layer assembly relaxes, particularly due to internal diffusion processes or internal reconfiguration of the fibers. This stress relaxation reduces, or even eliminates, the tendency to recovery of the functional layer assembly and thus creates an inherently stable three-dimensional functional layer assembly after step (C) is completed. This allows a durable three-dimensional shape of the functional layer assembly to be defined without the aid of another three-dimensional support structure in the form of a three-dimensionally shaped non-stretchable outer material.

Steps (A) and (B) are carried out to mechanically stretch the flat functional layer assembly into a pre-stretched three-dimensional shape. The material of the functional layer assembly would recover to its original flat shape if the stretching force were to be removed after completion of steps (A) and (B), but before commencement of step (C), due to the elastic properties of the material of the functional layer assembly, i.e. the inherent tendency of the material of the functional layer assembly to return to its original state. In Step (C) the essentially pre-stretched material of the functional layer assembly is formed into a stable three-dimensional configuration by heat-induced stress relaxation.

Using the method suggested herein allows a three-dimensional glove or glove lining to be created, without the need to connect a large number of small pieces to together to form an inherently stable three-dimensional outer material assembly. Thereby, a three-dimensional glove or glove lining made from only one piece, or from only a small number of pieces, can be manufactured. The number of seams required is drastically reduced, in particular the three-dimensional glove or glove lining only requires a single seam. The single seam may affect the functional layer assembly as a whole, i.e. extend from an inner side of the functional layer assembly to an outer side of the functional layer assembly. In case the functional layer assembly is a functional laminate formed by a plurality of layers laminated together, the same single seam bonds all the layers of the first portion of the functional layer assembly to all layers of the second portion of the functional layer assembly. In such configurations, the single seam may be regarded as extending from an inner side of the functional layer assembly to an outer side of the functional layer assembly. Moreover, the single seam may be visible on an outer side of the functional layer assembly. This allows a slim fitting, highly tactile and dexterous three-dimensional glove or glove lining to be provided. Excellent comfort and fit can be provided for a glove, since there is no need for a particularly stable three-dimensional outer material layer separate of the functional layer assembly. Thereby, the number of seams required for the glove is drastically reduced. Since a separate three-dimensional outer material layer is not required, a glove, or a glove lining, can be created directly from a flat, essentially two dimensional functional layer assembly, e.g. from a flat functional laminate. In case it is desired, the process described herein is used to create a glove lining which is to be attached to a separate outer material in a subsequent step.

A number of further optional features are set out in the following. These features can be provided in addition to the characteristics described above, alone or in combination with each other, unless specified otherwise.

Particularly, step (A) above may include preparing a flat functional layer assembly defining the shape of a fingered glove including one thumb and four fingers. Such flat functional layer assembly may be cut out from a sheet like material like a single layer of functional membrane or film, or like a functional laminate. Step (A) further may comprise superimposing a first flat portion of the functional layer assembly and a second flat portion of the functional layer assembly and joining the first and second flat portions, thereby forming a pocket having an insertion opening. In this way, a two-dimensional functional layer assembly is created having a shape or contour resembling the shape of the three-dimensional glove or glove lining in a two dimensional projection. For example, by superimposing first and second portions having the contour of a glove, and joining the superimposed portions with each other, a two dimensional structure is obtained having the shape of a glove. In principle, a person could insert a hand into the insertion opening in order to pull on the two dimensional glove structure. However, in view of its elasticity, the material of the two dimensional structure would cling to the person's hand, thus making it very difficult to pull the glove on and to remove it from the hand.

The first and second superimposed flat portions may be joined to each other by any suitable method. Particularly, the first and second superimposed flat portions may be joined to each other by a seam. The seam may be sewn, welded or glued. If the seam is sewn, it may be sealed as required to make the seam windproof, water resistant or waterproof. Particularly, the first and second flat superimposed portions may be joined along a contour of the three-dimensional glove or glove lining. In this case the seam may extend along a plane of symmetry of the glove or glove lining before the method steps are applied. In this case the first and second flat superimposed portions have the same shape and size. In particular, the seam may extend along a plane of symmetry of the finished three-dimensional glove or glove lining, after the method steps have been applied. This may be achieved by providing first and second flat superimposed portions having the same initial size and stretchability, or by providing first and second flat superimposed portions having different initial sizes and/or different stretchabilities, with the smaller sized portion being more stretchable than the larger sized portion. However, such configuration is not absolutely necessary. In particular embodiments, the seam may have an asymmetric extension before the method steps are applied. In such configurations, the seam will extend outside the plane of symmetry of the glove or glove lining, i.e. the two portions are of different sizes. Configurations with an asymmetric extension of the seam between the first and second portions may be advantageous in embodiments where the first and second superimposed portions are made from materials having different stretchability, since such configurations allow using the stretchability of the more stretchable material in a most efficient way. In particular, the seam may have an asymmetric extension in the finished three-dimensional glove or glove lining after the method steps have been applied. This may be achieved by providing portions with the same initial size and different stretchabilities or portions with different initial sizes and the same or different stretchabilities. Finished gloves or glove linings with asymmetric seams have the advantage that the seams do not chafe when the fingers are rubbed or squeezed together.

In some embodiments, only a single functional layer assembly may be required to form the flat functional layer assembly in step (A). Then, step (A) may comprise preparing a single functional layer assembly having a flat configuration and folding the functional layer assembly such as to superpose the first flat portion and the second flat portion.

In other embodiments, the flat functional layer assembly may be formed using at least two separate functional layer assemblies in step (A). Then, step (A) may comprise preparing a first functional layer assembly forming the first flat portion and preparing a second functional layer assembly forming the second flat portion, as well as superposing the first and second functional layer assemblies.

In each case, the superimposed first and second functional layer assemblies will be joined with each other, particularly by a seam, such as to form an insertion opening.

In order to temporarily transform the flat functional layer assembly into a three-dimensional state, step (B) may include fitting the flat functional layer assembly over a hand form defining the three-dimensional shape of the glove or glove lining. The functional layer assembly may be inverted before fitting the functional layer assembly over the hand form, so that the extension of the seam faces the inner side of the glove or glove lining. Due to the minimal extension of the seam there is no discomfort to the wearer.

Particularly, the hand form may be made in the shape of a fingered glove. In particular the hand form may be made in the shape of a fingered glove with the fingers and thumb being in different planes. This gives the hand form a natural configuration as in a normal hand with "opposing" thumbs, rather than the thumb being in the same plane as the gloves, as is the case with some hand forms. The hand form may also be made from one piece. At least in this case the functional layer assembly, after completion of step (C), and thus transformation of the functional layer assembly from a flat shape into an inherently three-dimensional shape has taken place, may still be sufficiently stretchable to allow for the three-dimensional functional layer assembly to be pulled off the one-piece hand form. It is also easier and more comfortable to put on and take off the glove or glove lining if some stretchability remains. Therefore, it is desirable that in step (C) heat is applied in such a way that relaxation processes in the functional layer assembly do not destroy the stretchability of the functional layer assembly completely, but only "re-define" the configuration of minimum internal stress in the functional layer assembly such that minimum stress occurs when the functional layer assembly has the shape defined by the hand form.

In particular embodiments, step (C) may include subjecting the functional layer assembly to heat in such a manner that the functional layer assembly reaches a temperature of at least 100° C., particularly a temperature of at least 120° C., particularly of at least 140° C. In particular embodiments the functional layer assembly may be subject to an exposure temperature of 90 to 180° C. for at least 30 s, particularly to an exposure temperature of 120 to 160° C. for at least 30 s. It has turned out that heat induced stress relaxation is sufficiently complete after exposure of a functional layer assembly, stretched to a deformation in the range of 20% to 35% (see the definition of deformation below) by pulling the functional layer assembly on a hand form, for at least 30 s at the specified exposure temperature ranges in step (C). The time it takes to pull on the functional layer assembly on the handform may be taken into account when calculating the exposure time, at least in cases where the handform is sufficiently pre-heated. Generally, the lower the temperatures during the exposure, the longer exposure times are required to sufficiently relax stress in the stretched functional layer assembly. It might be acceptable to use somewhat lower exposure temperatures in step (C) in case longer exposure times are acceptable. It is assumed that one factor influencing stress relaxation is internal diffusion processes in the macromolecular structure of at least one of the layers of the functional layer assembly. Such diffusion processes are promoted by high temperatures.

Stretchability of the functional layer assembly may be determined by a tensile strength measurement according to DIN EN 14704-1 (2005). A textile sample piece is elongated at a constant speed of 100 mm/min up to a force of 3 N/cm and then relaxed. The elongation of the textile sample piece is measured when a tensile force of 3 N/cm is applied at the end of the third cycle. A sample piece having a length of 50 mm length and a width of 25 mm is used. The tensile force is applied in the length direction.

Elongation is defined as the ratio (expressed in percent) of the difference in length of a sample piece of material after being subject to the tensioning force minus the length of the sample piece before being subject to the tensioning force, the difference divided by the length of the sample piece before being subject to the tensioning force. In case the functional layer assembly is made from more than one material, e.g. from different materials for the first and second superimposed portions, the above values of elongation refer to an average of the values measured for sample pieces of each material. Generally, the elongation will depend on a number of factors including the type of material, e.g. the functional layer material, the type of lamination, the types of textile layers, the type of fibers used in the textile layers. However, also other factors are important like the size of the sample piece tested.

It was found that the functional layer assembly may be made of a material, having in a tensile strength measurement according to DIN EN 14704-1 (2005) as described above, in a configuration before step (B), an elongation of at least 20% when subjected to a tensioning force of 3 N/cm in the at least one direction Moreover, experiments have shown that the functional layer assembly may be made of a material having, in a configuration after completion of step (C), an elongation, measured as described above, which is at most 85% of its elongation in a configuration after completion of step (B); particularly at most 75% of its elongation in a configuration after completion of step (B); particularly at most 65% of its elongation in a configuration after completion of step (B). Therefore, the material of the functional layer assembly, after completion of step (C) is still stretchable, however at a reduced value of the elongation achievable by applying the same tensioning force compared to its configuration after step (B).

Remaining deformation of a glove or glove lining may be measured directly at gloves or glove linings made from functional layer assemblies subject to the method described herein. In order to carry out such measurement, a sample functional layer assembly may be provided according to step (A). The circumference of the sample functional layer assembly in the hand region (i.e. at a location 20 mm below the beginning of the fingers, or at a level midway between the roots of thumb and index finger) may be determined.

Then, the sample functional layer assembly may be stretched to a deformation of about 20% in the hand region by pulling the flat functional layer assembly on a suitably configured handform, as specified in step (B). Deformation in the hand region refers to a ratio of the circumference of the handform in the hand region with respect to the circumference of the flat functional layer assembly at the same location in the hand region, as determined after completion of step (A).

Then, the sample functional layer assembly in its stretched configuration may be exposed to heat at a specified exposure temperature (e.g. to a temperature of 180° C. in an oven) and for a specified exposure time. (e.g. 30 s starting with the time the sample functional layer assembly is put into the oven in case the hand for is not preheated. In case the handform is pre-heated exposure time may start with the pulling on of the flat functional layer assembly)

Finally, the sample functional layer assembly may be pulled off the handform after lapse of the exposure time. The circumference of the sample functional layer assembly in the hand area (i.e. at a location 20 mm below the beginning of the fingers) may be measured any time after the sample functional layer assembly has been pulled off the handform and the glove has reached room temperature.

Remaining deformation of the sample functional layer assembly may be determined as the ratio of the difference in the circumference of the sample functional layer assembly after pulling off from the handform minus the circumference of the sample functional layer assembly before pulling on the handform, the difference divided by the circumference of the sample functional layer assembly before pulling on the handform (expressed in percent).

In particular embodiments, it was found out that the functional layer assembly, after completion of step (C), has a remaining deformation in the hand region as defined above, of at least 5%, particularly of at least 10%, particularly of at least 15%. Remaining definition may be even larger in other regions of the glove or glove lining, e.g. in the finger regions remaining deformation may be up to 20%, particularly up to 25%.

Relative remaining deformation may be defined as the ratio of remaining deformation of the sample functional layer after completion of step (C) to deformation of the sample functional layer after completion of step (B). Recovery may be defined as 100% minus the relative remaining deformation.

It was found that relative remaining deformation of the sample functional layer assembly may be at least 25%, particularly at least 50%, particularly at least 75%. Correspondingly, recovery of the sample functional layer may be at most 75%, particularly at most 50%, particularly at most 25%.

The functional layer assembly may comprise at least one component having stretchable characteristics. Step (C) may include applying a quantity of heat sufficient to relax the tensional stress in said component. In particular embodiments, the functional layer assembly may include at least one stretchable textile layer comprising the at least one component. Step (C) may include applying a quantity of heat sufficient to change to the configuration of the at least one component such as to induce stress relaxation and thereby change the stretchable characteristics of the component.

A temperature of 90-160° C., preferably 120-140° C., may be applied for up to 5 minutes, preferably only for some seconds, e.g. up to 30 seconds.

Particularly, the at least one component may include a stretchable fiber, e.g. made from polyamide (PA) or polyurethane (PU) or rubber—Examples for such fibers are known as spandex or Lycra fibers.

According to a further aspect, the present invention relates to a water vapour permeable (breathable) three-dimensional glove or glove lining, which is manufactured by the method described herein.

Such a three-dimensional glove or glove lining a glove or a glove lining, may be composed of a functional layer assembly having the configuration of a functional layer or of a functional laminate made up with a functional layer and at least one textile layer attached to the functional layer. The functional layer assembly may have a first portion and a second portion superimposed on each other such as to define a shape of the three-dimensional glove or glove lining. The first portion and the second portion may be joined together such as to form a pocket having an insertion opening. The functional layer assembly may have an inherently stable three-dimensional structure. At least a palm portion is water vapor permeable. This is done in order to allow sweat produced by the palm of the hand to escape from the glove in the form of water vapor. Finally, the functional layer assembly has a single seam connecting the first portion and the second portion of the functional layer assembly.

The three-dimensional glove or glove lining is obtained by preparing the functional layer assembly in a flat configuration and subjecting the functional layer assembly to a stretching force while in a flat configuration. Thereby, the flat configuration of the functional layer assembly is transformed into a three-dimensional structure under the influence of the stretching force. Heat is applied to the functional layer assembly while the functional layer assembly is subject to the stretching force, thereby relaxing the functional layer assembly and transforming the three-dimensional structure of the functional layer assembly into an inherently stable three-dimensional structure. Once the relaxation of the functional layer assembly is completed, the stretching force is removed from the functional layer assembly.

Particularly, the first portion and the second portion of the functional layer assembly may be joined along a contour of the three-dimensional glove or glove lining, e.g. by means of a seam. The seam may have a symmetric extension with respect to a plane of symmetry of the three-dimensional glove or glove lining. Particularly, the seam may extend within a plane of symmetry of the three-dimensional glove or glove lining. In other embodiments, the seam may extend asymmetrically with respect to a plane of symmetry of the three-dimensional glove or glove lining.

Particularly, the functional layer assembly may have a folded configuration with the first portion and the second portion folded and superimposed on each other such as to define the shape of the three-dimensional glove or glove lining. In some embodiments, the functional layer assembly may comprise a first functional layer assembly forming the first portion and a second functional layer assembly forming the second portion.

Particularly, the functional layer assembly may have the shape of a fingered glove including one thumb and four fingers.

Besides the seam required to form the two dimensional or flat functional layer assembly having an insertion opening, the three-dimensional glove or glove lining may have additional seams, if desired. Such additional seams typically will not be required to form the two dimensional or flat functional layer assembly. Particularly, such additional seams may include decorative seams, or seams for adding additional layers, patches, or other structures to the three-dimensional glove or glove lining. Examples include patches attached on the outer side for adding grip or touch sensitivity or durability in particular regions of the three-dimensional glove or glove lining. Further examples include patches or structures (e.g. conductive wires) attached on the outer side of the three-dimensional glove or glove lining for adding touch pad sensitivity with respect to operation of smartphones, tablet computers, and the like, while wearing the three-dimensional glove or glove lining. Further, the contour may define the shape of a fingered glove or glove lining. Such additional structures may be attached by sewing, gluing using adhesive, welding, printing, or any other suitable method.

Moreover, in some embodiments, the three-dimensional glove or glove lining may include additional pieces of material to facilitate pulling on/off the three-dimensional glove or glove lining.

Embodiments of the invention will be described in more detail below, taken reference to the enclosed Figures.

Figure 2:
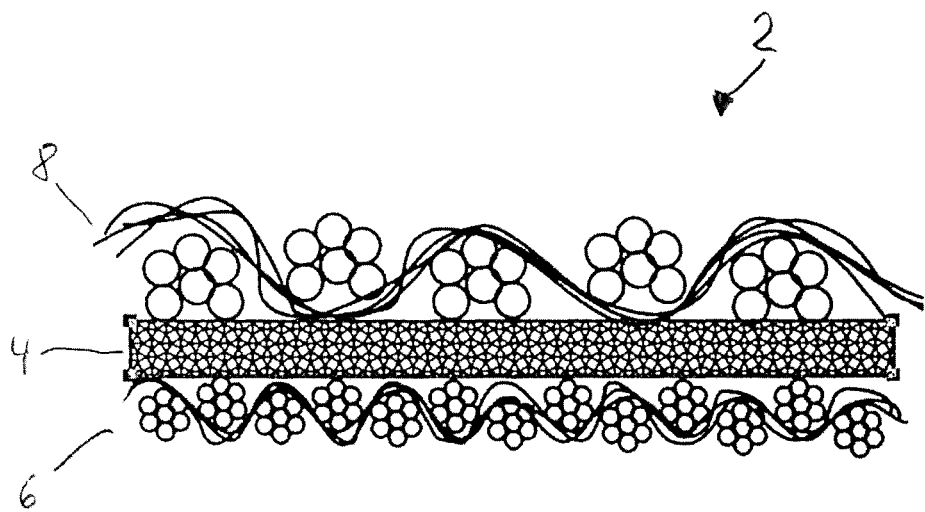
FIG. 2 shows a schematic of an embodiment of a functional laminate from which the functional layer assembly may be formed.

FIG. 2 shows a schematic of an embodiment of a functional laminate 2 from which the functional layer assembly may be formed The functional laminate 2 has a functional layer 4 and two textile layers 6, 8 attached to each side of the functional layer 4. The functional layer 4 is made with porous ePTFE and is windproof. The textile layers 6, 8 are made from polyester fibers, which have been texturised. The textile layers 4, 6 are stretchable, since the texturized fibers are able to elongate under the influence of a tensioning force and tend to recover their original configuration after the tensioning force is released. The stretchable characteristics of the textile layers 4, 6 change when the textile layers 4, 6 are subject to heat in a stretched configuration, as described in more detail herein.

Figure 1:
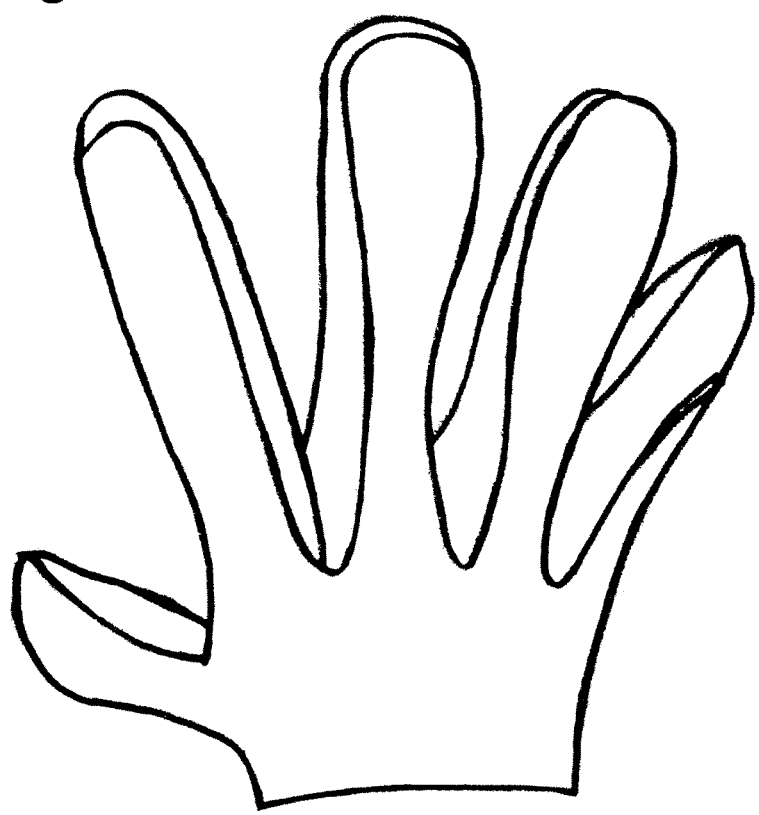
FIG. 1 shows a glove construction made from a functional layer assembly according to the prior art, in which many seams are necessary at least in the areas of the fingers to give the construction a type of 3D configuration in the finger and thumb section.

FIGS. 2a and 2b show an example for a first embodiment of a flat functional layer assembly 10 having a flat configuration as prepared in step (A) of the method described herein The functional layer assembly 10 according to the first embodiment is made from a single functional laminate 2 according to FIG. 1 and has a first flat portion 12 and second flat portion 14 each of which has the shape of a fingered glove. The first flat portion 12 corresponds to the backhand portion of the fingered glove. The second flat portion 14 corresponds to the palm portion of the fingered glove. As shown in FIG. 2b, the first flat portion 12 and the second flat portion 14 are folded and superimposed on each other to define the shape of a fingered glove. The first and second flat portions 12, 14 are joined to each other along the contour of the fingered glove via a single seam 16. In the embodiment of FIG. 3b the seam 16 is a symmetrical seam. The seam 16 may be a stitched seam, a welded seam, or a glued seam. The single seam 16 extends from an outer side of the first flat portion 12 opposite to the second flat portion 14 to an outer side of the second flat portion 14 opposite to the first flat portion 12. Therefore, only one seam 16 is required to fully connect the first and second flat portions 12, 14 along the contour of the fingered glove. The seam 16 may be sealed as required, e.g. by applying a seam tape (not shown). The seam 16 is visible on an outer side of the flat functional layer assembly 10, as indicated by dotted lines in FIG. 3b. An insertion opening 18 is left open by the seam 16 for introducing a hand or a handform into the flat functional layer assembly 10.

Figure 4A:
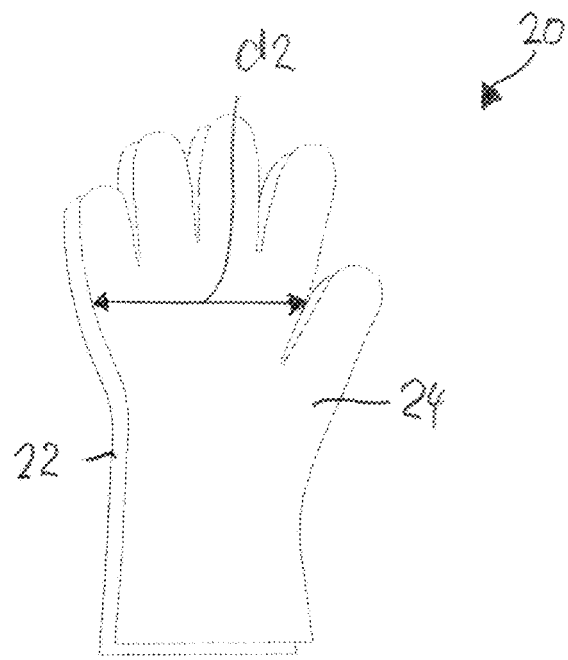
FIGS. 4a and 4b show an example of a second embodiment of a functional layer assembly having a flat configuration as prepared in step (A).
Figure 4B:
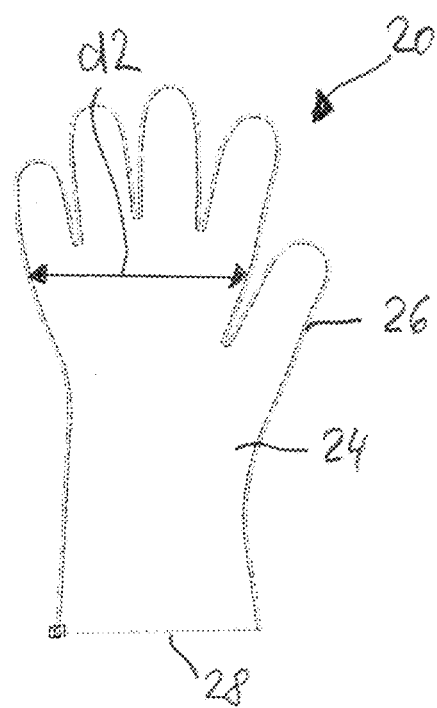

FIGS. 4a and 4b show an example of a second embodiment of a flat functional layer assembly 20 having a flat configuration as prepared in step (A). The flat functional layer assembly 20 according to the second embodiment is made from two functional laminates 22, 24 superimposed on each other and joined to each other along a contour of the fingered glove via a seam 26; The functional laminates 22, 24 according to FIG. 2 may have a configuration corresponding to the functional laminate 2 of FIG. 1. The first functional laminate 22 forms a first flat portion corresponding to the backhand portion of the fingered glove and the second functional laminate 24 forms a second flat portion corresponding to the palm portion of the fingered glove. The first and second functional laminates 22, 24 are superimposed on each other to define the shape of a fingered glove. In the embodiment of FIG. 4b, seam 26 is a symmetrical seam. The first functional laminate 22 may be identical to the second functional laminate 24. The seam 26 may be a stitched seam, a welded seam, or a glued seam. The single seam 26 extends from an outer side of the first flat functional laminate 22 opposite to the second flat functional laminate 24 to an outer side of the second flat functional laminate 24 opposite to the first flat functional laminate 22. Therefore, only one seam 26 is required to fully connect the first and second flat functional laminates 22, 24 along the contour of the fingered glove. The seam 26 may be sealed as required, e.g. by applying a seam tape (not shown). The seam 26 is visible on an outer side of the flat functional layer assembly 20, as indicated by dotted lines in FIG. 4b. An insertion opening 28 is left open by the seam 26 for introducing a hand or a handform into the flat functional layer assembly 20 (see FIG. 6).

Figure 5A:
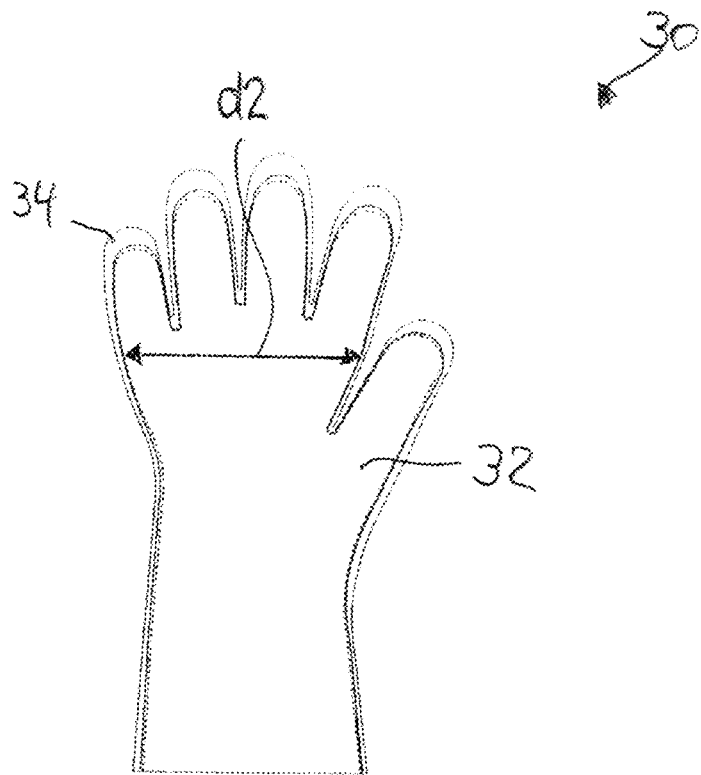
FIGS. 5a and 5b show an example of a third embodiment of a functional layer assembly having a flat configuration as prepared in step (A).
Figure 5B:
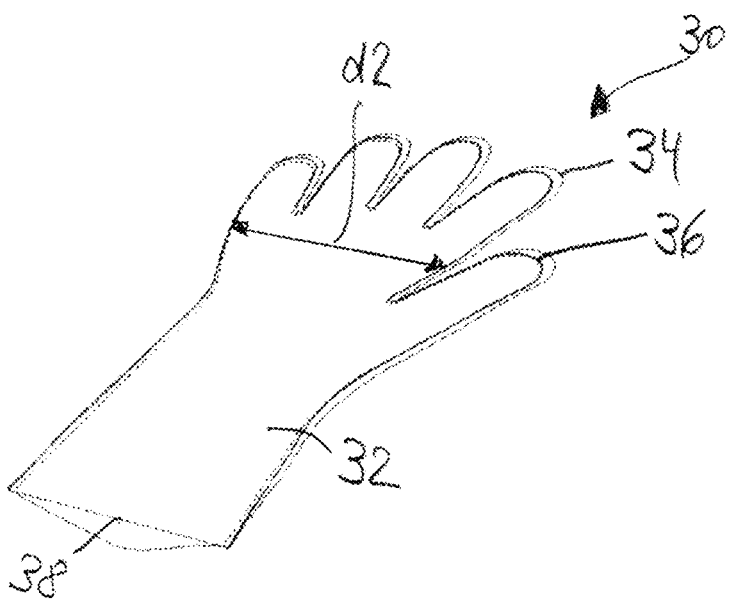

FIGS. 5a and 5b show an example of a third embodiment of a flat functional layer assembly 30 having a flat configuration as prepared in step (A). The functional layer assembly 30 according to the third embodiment is made from two functional laminates 32, 34. Each functional laminate 32, 34 may have a configuration of the functional laminate 2 of FIG. 1. The functional laminates 32, 34 are superimposed on each other and joined to each other along a contour of the fingered glove via a seam 36. The seam 36 may be a stitched seam, although a welded seam or a glued seam would be possible as well. The seam 36 may be sealed as required, e.g. by applying a seam tape (not shown). In the third embodiment of the flat functional layer assembly 30 the first functional laminate 32 forming a backhand portion of the fingered glove is cut in a smaller size than the second functional laminate 34 forming a palm portion of the fingered glove. The first functional laminate 32 may be identical to the second functional laminate 34. Alternatively, functional laminates of different configuration may be used for the first functional laminate 32 and the second functional laminate 34. In the embodiment shown in FIGS. 5a and 5b, functional laminates 32, 34 of different configuration and size are used. Particularly, the first functional laminate 32 has a smaller stretchability than the second functional laminate 34. Thereby, when joining the first and second functional laminates 32, 34 together along a seam 36, the seam 36 sits on the back of the hand and is not in the way or chafes when the hand touches or carries something. Thereby, the first functional laminate 32 and the second functional laminate 34 are joined to each other by an asymmetric seam 36. This asymmetry of the seam 36 is increased when pulling the functional layer assembly 30 onto the handform, particularly in case the second functional laminate 34 is more stretchable than the first functional laminate. The single seam 36 extends from an outer side of the first flat functional laminate 32 opposite to the second flat functional laminate 34 to an outer side of the second flat functional laminate 34 opposite to the first flat functional laminate 32. Therefore, only one seam 36 is required to fully connect the first and second flat functional laminates 32, 34 along the contour of the fingered glove. The seam 36 is visible on an outer side of the flat functional layer assembly 30, as indicated by dotted lines in FIG. 5b. An insertion opening 38 is left open by the seam 36 for introducing a hand or a handform into the flat functional layer assembly 30.

Figure 6:
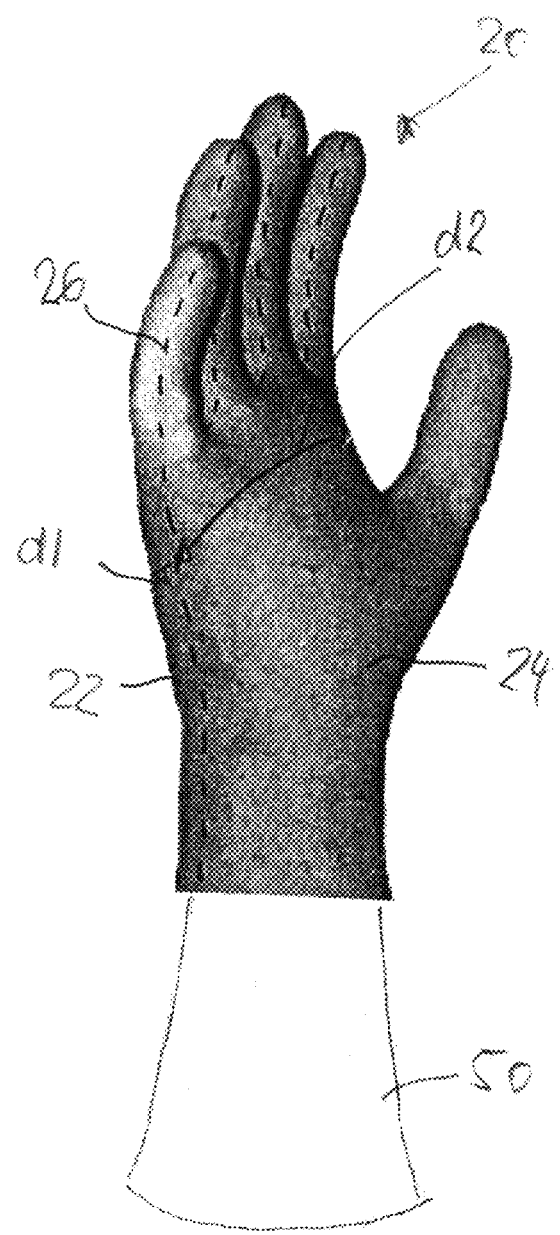
FIG. 6 shows the functional layer assembly according to the second embodiment in a situation after step (B), i.e. the functional layer assembly is pulled over the former and stretched.

FIG. 6 shows the functional layer assembly 20 according to the second embodiment in a situation after step (B), i.e. the functional layer assembly 20 is pulled over and handform 50 and stretched. FIG. 6 shows an example of the second embodiment of the functional layer assembly 20 made from two identical functional laminates; according to FIG. 1. The first functional laminate forming the first flat portion 22 and the second functional laminate forming the second flat portion 24 have identical shapes and are superimposed on each other to define the shape of a fingered glove. Thus, functional layer assembly 20, after being pulled on the handform 50 and stretched, still has first and second flat portions 22, 24 of identical shape which are joined by a symmetric seam 26 (indicated by a dashed line in FIG. 6).

Figure 7:
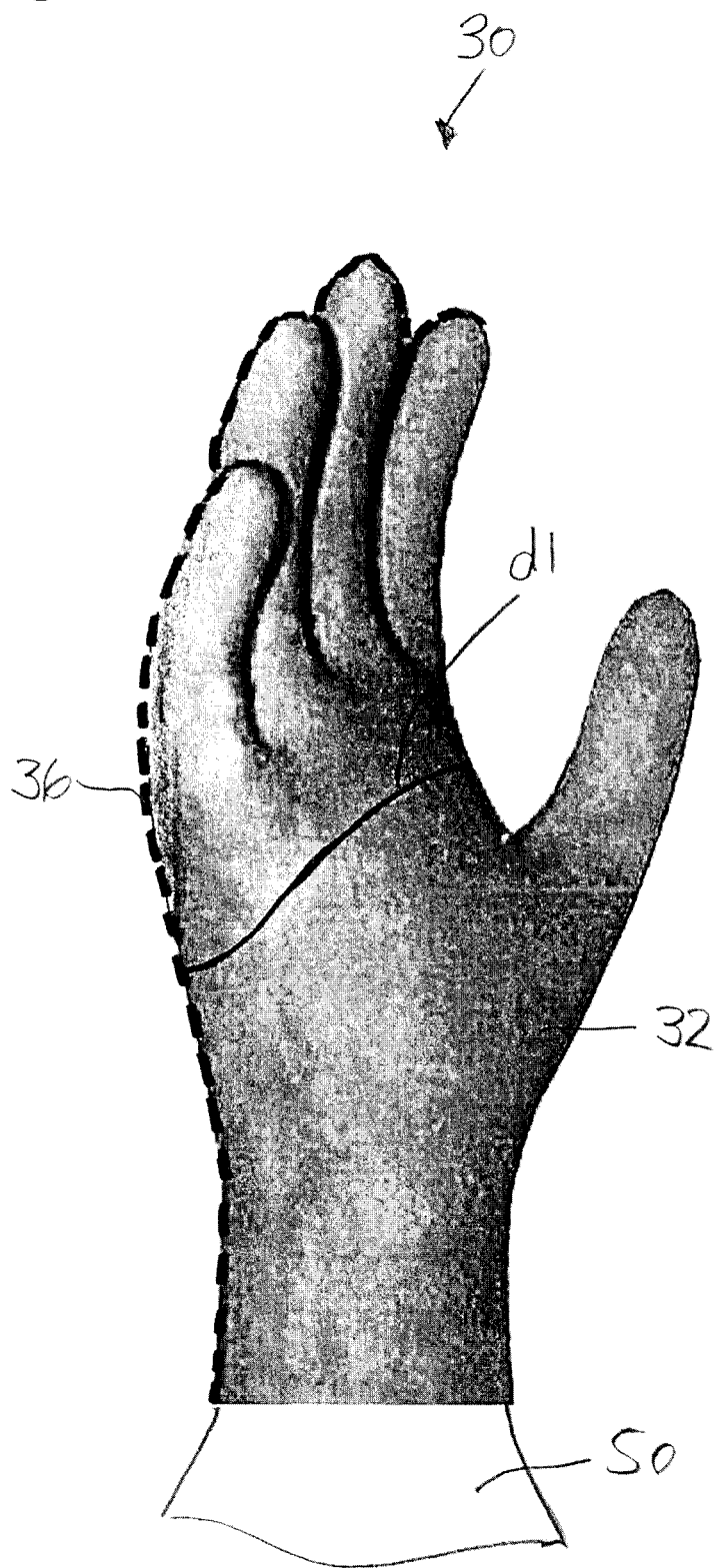
FIG. 7 shows a functional layer assembly according to another embodiment in a situation after step (B), i.e. the functional layer assembly is pulled over the former and stretched.

FIG. 7 shows an example of the functional layer assembly 30 according to the third embodiment in a situation after step (B), i.e. the functional layer assembly 30 is pulled over and handform 50 and stretched. In the example shown in FIG. 7 the functional layer assembly 30 is made from two identical functional laminates; according to FIG. 1, forming the first flat portion 32 and the second flat portion 34, respectively. The first flat portion 32 and the second flat portion 34 have different shapes, since the first flat portion 32 is bigger in size than the second flat portion 34, and are superimposed on each other to define the shape of a fingered glove. Thus, functional layer assembly 30, after being pulled on the handform 50 and stretched, has a first portion 32 of larger size (which forms the palm portion of the glove) and a second portions 34 of smaller size (which forms the backhand portion of the glove). The first and second portions 32, 34 are joined by an asymmetric seam 36 (indicated by a dashed line in FIG. 7).

Figure 8:
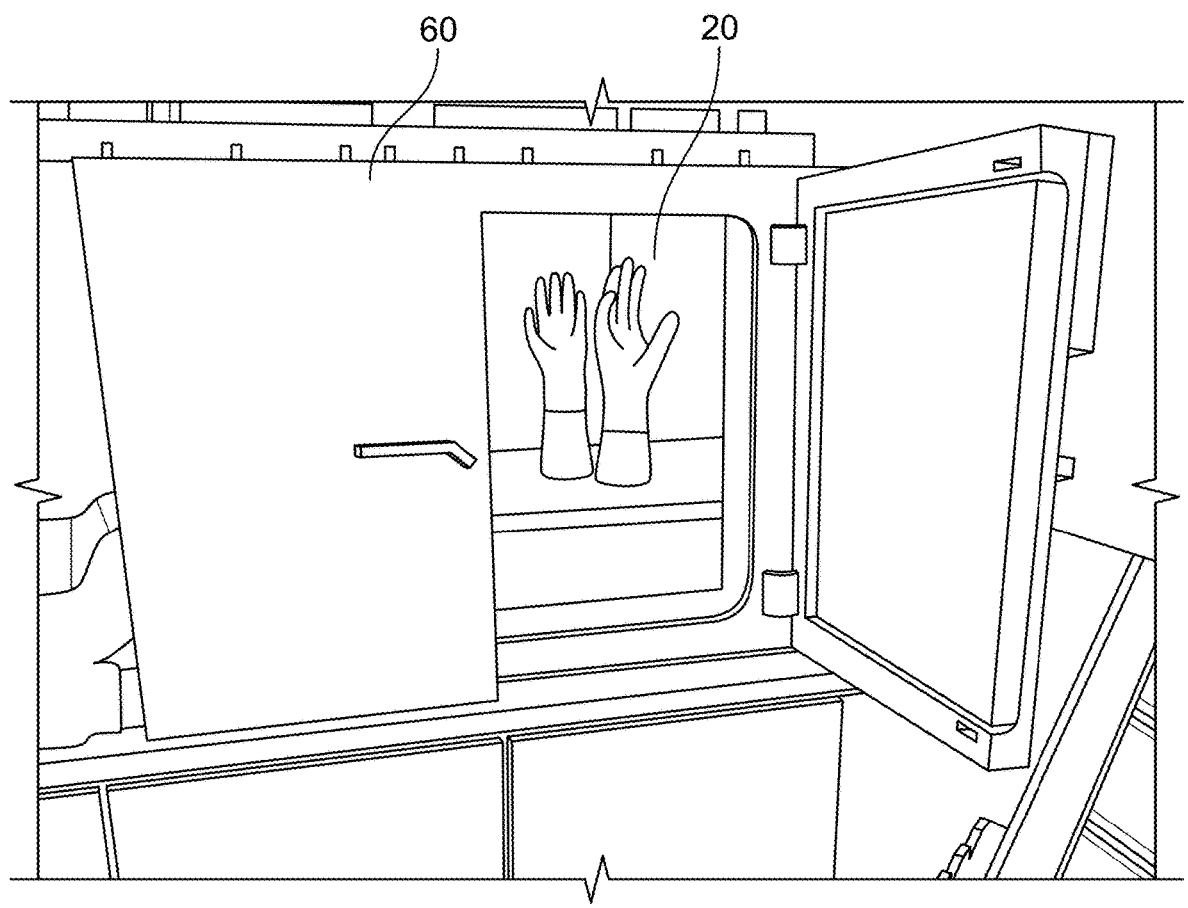
FIG. 8 shows the functional layer assemblies according to the second embodiments in a situation in step (C), i.e. the functional layer assembly on the former is put into an oven and heated.

FIG. 8 shows the functional layer assemblies 20 according to the second embodiments in a situation in step (C), i.e. the functional layer assembly 20 in a configuration pulled on the handform 50 and stretched being put into an oven 60 and heated.

Figure 9:
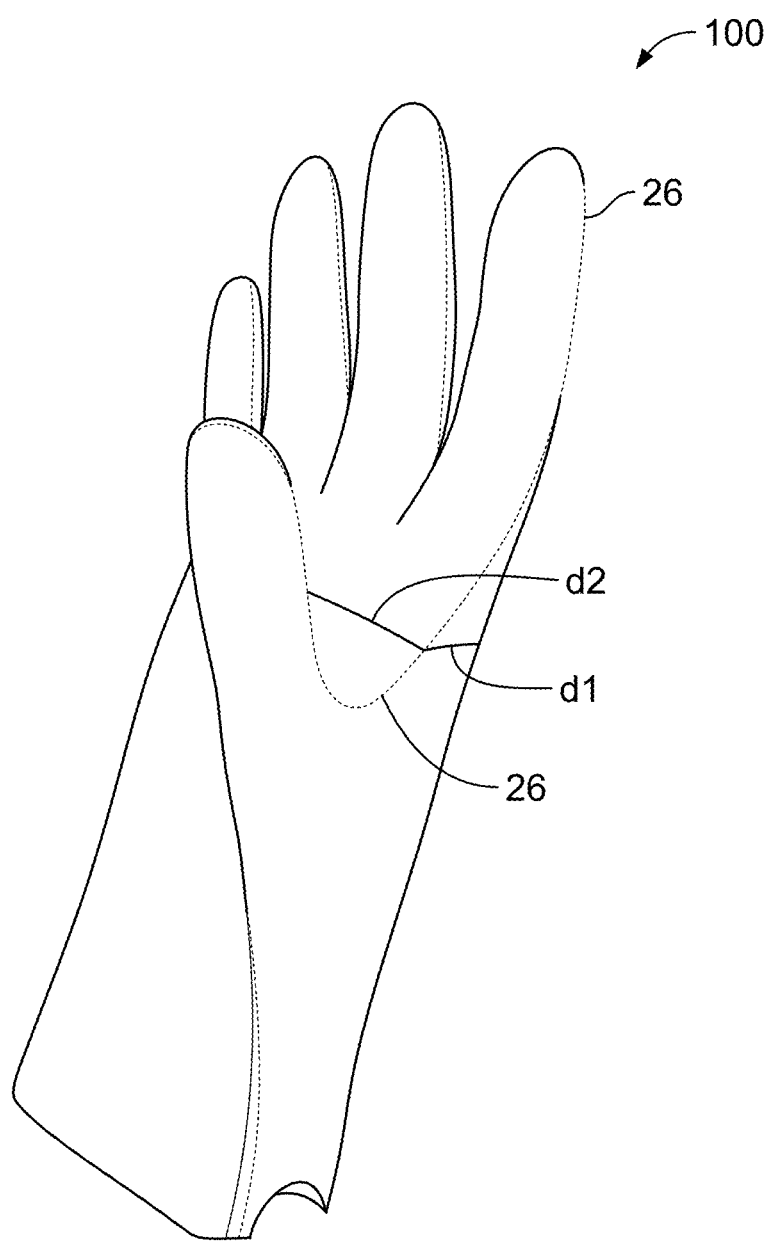
FIG. 9 shows the functional layer assemblies according to the second embodiment in a situation after step (D) is completed, i.e. the functional layer assembly is pulled off the former and shows its inherently stable three-dimensional shape.

FIG. 9 shows a three dimensional functional layer assembly 100 according to the second embodiment in a situation after step (D) is completed, i.e. the functional layer assembly 100 has been pulled off the handform 50 and shows its inherently stable three-dimensional shape.

As described above, the invention uses the principle of stress relaxation in stretchable textile materials, particularly textile materials comprising stretchable polymer materials like elastomers, in order to transform a flat functional laminate into an inherently stable three-dimensional shape of the functional laminate. Particularly, the invention makes use of the fact that stress relaxation in can be boosted by application of heat. This allows an inherently stable three-dimensional shape of the functional laminate to be defined without the aid of another three-dimensional support structure in the form of a three-dimensionally shaped non-stretchable outer material.

Using the method suggested herein allows a three-dimensional glove or glove lining to be created, without the need to connect a large number of small pieces to together to form an inherently stable three-dimensional outer material assembly. Thereby, a three-dimensional glove or glove lining made from only one piece, or from only a small number of pieces, can be manufactured. The number of seams required is drastically reduced, in particular the three-dimensional glove or glove lining only requires one seam.

Steps (A) and (B) are carried out using an essentially non-formable material, because the functional layer assembly is required to have elastic characteristics and thereby would recover towards its original shape after stress relaxation. In Step (C) the essentially non-formable material is transformed into a formable configuration by heat-induced stress relaxation.

Step (C) refers to transforming the stretchable or elastic functional layer assembly into an inherently stable three dimensional functional layer assembly. Being inherently stable the functional layer assembly, after having been subject to step (C), no longer relaxes completely after removal of the stretching force. The functional layer assembly does not show any longer significant recovery towards its original flat shape. This implies that the functional layer assembly does not significantly change its three-dimensional shape, after having been subject to step (C). Particularly, the functional layer assembly does not recover to its original flat shape, even in the absence of a three-dimensional supporting layer, like a three-dimensional outer material layer to which the functional layer assembly is joined.

EXAMPLES

Example A

A flat functional layer assembly was prepared by superimposing a flat backhand laminate forming the first portion of the functional layer assembly and a flat palm laminate forming the second portion of the functional layer assembly.

The flat backhand laminate had a three layer configuration as follows:

Outer shell: 100% polyester (PES) 50 denier interlock knit

Functional layer: 100% expanded polytetrafluorethylene (ePTFE) having a microporous configuration comprising nodes of PTFE interconnected by fibrils of PTFE as taught in U.S. Pat. Nos. 3,953,566, 3,962,153, 4,096, 227 and 4,187,390

Backer layer: 100% PES microfleece knit

The overall composition of the laminate was 99% by weight PES and 1% by weight ePTFE. The laminate weight was 265 g/m$^2$ The outer shell and the backer layer were laminated to the functional layer such as to ensure that the laminate remains breathable. The backhand laminate had a water vapor permeability (WVP), measured according to EN ISO 15496 (2004), method 1, of 0.24 g/(Pa*m$^2$*h).

A sample piece of the backhand laminate was prepared and clamped in the testing machine such that an area having a width of 25 mm in the machine direction of the laminate and a length of 50 mm in the cross direction was subjected to a stress/strain measurement as specified in DIN EN 14704-1 (2005). The test was done by carrying out three cycles of elongation up to a maximum tension of 3 N/cm, the first and second cycles followed by release of the tensioning force, respectively. At the third cycle, elongation was measured when the tensioning force reached 3 N/cm. At 3 N/cm, an elongation of 51% was measured. Elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

The palm laminate had a three layer configuration as follows:

Outer shell: 87% PES, 13% elastane (EL) low denier, fine gauge knit

Functional layer: 100% expanded polytetrafluorethylene (ePTFE) having a microporous configuration comprising nodes of PTFE interconnected by fibrils of PTFE as taught in U.S. Pat. Nos. 3,953,566, 3,962,153, 4,096,227 and 4,187,390

Backer layer: 100% PES light denier gradient knit

The laminate had a weight of 180 g/m$^2$. The outer shell and the backer layer were adhered or laminated to the functional layer such as to ensure that the laminate remains breathable. The palm laminate had a water vapor permeability (WVP), measured according to EN ISO 15496 (2004), method 1, of 0.44 g/(Pa*m$^2$*h).

A sample piece of the palm laminate was prepared and clamped in the testing machine such that an area having a width of 25 mm in the machine direction of the laminate and a length of 50 mm in the cross direction was subjected to a stress/strain measurement as specified in DIN EN 14704-1 (2005). The test was done by carrying out three cycles of elongation up to a maximum tension of 3 N/cm, the first and second cycles followed by release of the tensioning force, respectively. At the third cycle, elongation was measured when the tensioning force reached 3 N/cm. At 3 N/cm, an elongation of 49% was measured. Elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

A piece of the flat backhand laminate was cut in the shape of a finger glove as shown in FIG. 4a. A piece of the flat palm laminate was cut in the shape of the finger glove as shown in FIG. 4a. The pieces of the flat backhand laminate and the flat palm laminate were superimposed and joined to each other by a non stretchable stitched seam extending along the contour of the finger glove, as shown in FIG. 4b. Thereby a flat functional layer assembly was obtained.

The circumference of the flat functional layer assembly at a position in the middle hand region (20 mm below the roots of the fingers, corresponding to the mid between the roots of the index finger and the thumb) was 190 mm (backhand laminate: d1=95 mm, palm laminate: d2=95 mm).

The flat functional layer laminate was pulled on a handform (see FIG. 6), thereby stretching the functional layer assembly. The circumference of the handform at the same position in the middle hand region (20 mm below the roots of the fingers, corresponding to the mid between the roots of the index finger and the thumb) was d1+d2=230 mm. Therefore, by pulling on the handform the functional layer assembly was stretched to a deformation of (230 mm-190 mm)/190 mm×100=21% at the mentioned position in the middle hand region (20 mm below the roots of the fingers, corresponding to the mid between the roots of the index finger and the thumb).

Then, the functional layer assembly was subjected to a heat treatment while being stretched on the handform (see FIG. 8). The handform with the functional layer assembly was put into a furnace (type: FED 240, as available from Binder GmbH, Tuttlingen, Germany). The furnace was pre-heated to a temperature of 180° C. The handform with the functional layer assembly was not pre-heated, but held at room temperature when being put into the furnace. The handform was held in the furnace for an exposure time of 120 seconds.

After lapse of the exposure time, the handform with the functional layer assembly was removed from the furnace and the functional layer assembly was pulled off the handform. To determine the remaining deformation of the functional layer assembly, the circumference of the functional layer assembly at the same position in the middle hand region (20 mm below the roots of the fingers, corresponding to the mid between the roots of the index finger and the thumb) was measured, after the functional layer assembly had been pulled off the handform. The circumference of the functional layer assembly at the mentioned position in the middle hand region (20 mm below the roots of the fingers, corresponding to the mid between the roots of the index finger and the thumb) was measured to be d1+d2=215 mm. Therefore, the remaining deformation of the functional layer assembly at the mentioned position in the middle hand region (20 mm below the roots of the fingers, corresponding to the mid between the roots of the index finger and the thumb) was determined to be (215 mm-190 mm)/190 mm×100=13%. Relative remaining deformation was determined to be 13%/21%=62%. Thus, recovery was determined to be 100%-62%=38%.

After being subject to the stretching treatment and heat exposure treatment and being cooled to room temperature, sample pieces of the palm laminate and the back hand laminate were cut out from functional layer assembly and again subjected to a stress/strain measurement as specified DIN EN 14704-1 (2005). The test was carried out in the same way as described above. An elongation of 28% was measured for the backhand laminate and an elongation of 40% was measured for the palm laminate. Hence, a reduction in elongation of both the backhand laminate and palm laminate was measured after the laminates have been subject to the stretching treatment and heat exposure treatment with respect to the elongation of the laminates before being subject to the stretching and heat exposure treatment. This indicates that the laminates were still elastic, but at a reduced elasticity.

Example B

A flat functional layer assembly was prepared by superimposing a flat backhand laminate forming the first portion of the functional layer assembly and a flat palm laminate forming the second portion of the functional layer assembly.

The flat backhand laminate had a three layer configuration as follows:

Outer shell: 100% polyester (PES) fleece knit

Functional layer: 100% expanded polytetrafluorethylene (ePTFE) having a microporous configuration comprising nodes of PTFE interconnected by fibrils of PTFE as taught in U.S. Pat. Nos. 3,953,566, 3,962,153, 4,096,227 and 4,187,390.

Backer layer: 100% PES knit

The laminate weight was 288 g/m$^2$.

The outer shell and the backer layer were laminated to the functional layer such as to ensure that the laminate remains breathable. The backhand laminate had a water vapor permeability (WVP), measured according to EN ISO 15496 (2004), method 1, of 0.19 g/(Pa*m$^2$*h).

A sample piece of the backhand laminate was prepared and clamped in the testing machine such that an area having a width of 25 mm in the machine direction of the laminate and a length of 50 mm in the cross direction was subjected to a stress/strain measurement as specified in DIN EN 14704-1 (2005). The test was done by carrying out three cycles of elongation up to a maximum tension of 3 N/cm, the first and second cycles followed by release of the tensioning force, respectively. At the third cycle, elongation was measured when the tensioning force reached 3 N/cm. At 3 N/cm, an elongation of 38% was measured. Elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

The palm laminate had a three layer configuration as follows:
Outer shell: 100% PES 50 denier interlock knit
Functional layer: 100% expanded polytetrafluorethylene (ePTFE), having a microporous configuration comprising nodes of PTFE interconnected by fibrils of PTFE as taught in U.S. Pat. Nos. 3,953,566, 3,962,153, 4,096,227 and 4,187,390
Backer layer: 100% PES microfleece knit The overall composition of the laminate was 99% by weight PES and 1% by weight ePTFE. The laminate had a laminate weight of 265 g/m². The outer shell and the backer layer were adhered or laminated to the functional layer such as to ensure that the laminate remains breathable. The palm laminate had a water vapor permeability (WVP), measured according to EN ISO 15496 (2004), method 1, of 0.44 g/(Pa*m²*h).

A sample piece of the palm laminate was prepared and clamped in the testing machine such that an area having a width of 25 mm in the machine direction of the laminate and a length of 50 mm in the cross direction was subjected to a stress/strain measurement as specified in DIN EN 14704-1 (2005). The test was done by carrying out three cycles of elongation up to a maximum tension of 3 N/cm, the first and second cycles followed by release of the tensioning force, respectively. At the third cycle, elongation was measured when the tensioning force reached 3 N/cm. At 3 N/cm, an elongation of 49% was measured. Elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

A piece of the flat backhand laminate was cut in the shape of a finger glove as shown in FIG. 4a. A piece of the flat palm laminate was cut in the shape of the finger glove as shown in FIG. 4a. The pieces of the flat backhand laminate and the flat palm laminate were superimposed and joined to each other by a non stretchable stitched seam having a width of 2 mm and extending along the contour of the finger glove, as shown in FIG. 4b. Thereby a flat functional layer assembly was obtained.

The circumference of the flat functional layer assembly at a position in the middle hand region (20 mm below the roots of the fingers, corresponding to the mid between the roots of the index finger and the thumb) was 190 mm (backhand laminate: d1=95 mm, palm laminate: d2=95 mm).

The flat functional layer laminate was pulled on a handform (see FIG. 6), thereby stretching the functional layer assembly. The circumference of the handform at the same position in the middle hand region (20 mm below the roots of the fingers, corresponding to the mid between the roots of the index finger and the thumb) was d1+d2=230 mm. Therefore, by pulling on the handform the functional layer assembly was stretched to a deformation of (230 mm-190 mm)/190 mm×100=21% at the mentioned position in the middle hand region (20 mm below the roots of the fingers, corresponding to the mid between the roots of the index finger and the thumb).

Then, the functional layer assembly was subjected to a heat treatment while being stretched on the handform (see FIG. 8). The handform with the functional layer assembly was put into a furnace (type: FED 240, as available from Binder GmbH, Tuttlingen, Germany). The furnace was pre-heated to a temperature of 180° C. The handform with the functional layer assembly was not pre-heated, but held at room temperature when being put into the furnace. The handform was held in the furnace for an exposure time of 120 seconds.

After lapse of the exposure time, the handform with the functional layer assembly was removed from the furnace and the functional layer assembly was pulled off the handform. The now three-dimensional functional layer assembly was stored at room temperature (see FIG. 8). To determine the remaining deformation of the functional layer assembly, the circumference of the functional layer assembly at the same position in the middle hand region (20 mm below the roots of the fingers, corresponding to the mid between the roots of the index finger and the thumb) was measured after the functional layer assembly had been pulled off the handform. The circumference of the functional layer assembly at the mentioned position in the middle hand region (20 mm below the roots of the fingers, corresponding to the mid between the roots of the index finger and the thumb) was measured to be d1+d2=210 mm. Therefore, the remaining deformation of the functional layer assembly at the mentioned position in the middle hand region (20 mm below the roots of the fingers, corresponding to the mid between the roots of the index finger and the thumb) was determined to be (210 mm-190 mm)/190 mm×100=10%. Relative remaining deformation was determined to be 10%/21%=48%. Thus, recovery was determined to be 100%-48%=52%.

After being subject to the stretching treatment and heat exposure treatment and being cooled to room temperature, sample pieces of the palm laminate and the back hand laminate were cut out from functional layer assembly and again subjected to a stress/strain measurement as specified DIN EN 14704-1 (2005). The test was carried out in the same way as described above. An elongation of 23% was measured for the backhand laminate and an elongation of 30% was measured for the palm laminate. Hence, a reduction in elongation of both the backhand laminate and palm laminate was measured after the laminates have been subject to the stretching treatment and heat exposure treatment with respect to the elongation of the laminates before being subject to the stretching and heat exposure treatment. This indicates that the laminates were still elastic, but at a reduced elasticity.

Example C

A flat functional layer assembly was prepared by folding a flat laminate such as to form the first portion of the functional layer assembly (backhand laminate) and the second portion of the functional layer assembly (palm laminate).

Thus, both the flat backhand laminate and the flat palm laminate had the same three layer configuration as follows:

Outer shell: 100% polyester (PES) fleece knit
Functional layer: 100% polyurethane
Backer layer: 100% PES fleece knit The overall composition of the laminate was 94% by weight PES and 6% by weight ePTFE. The laminate weight was 355 g/m²

The outer shell and the backer layer were laminated to the functional layer such as to ensure that the laminate remains breathable. The laminate had a water vapor permeability (WVP), measured according to EN ISO 15496 (2004), method 1, of 0.08 g/(Pa*m²*h).

A sample piece of the laminate was prepared and clamped in the testing machine such that an area having a width of 25 mm in the machine direction of the laminate and a length of 50 mm in the cross direction was subjected to a stress/strain measurement as specified in DIN EN 14704-1 (2005). The test was done by carrying out three cycles of elongation up to a maximum tension of 3 N/cm, the first and second cycles followed by release of the tensioning force, respectively. At the third cycle, elongation was measured when the tensioning force reached 3 N/cm. At 3 N/cm, an elongation of 40% was measured. Elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

Figure 3A:
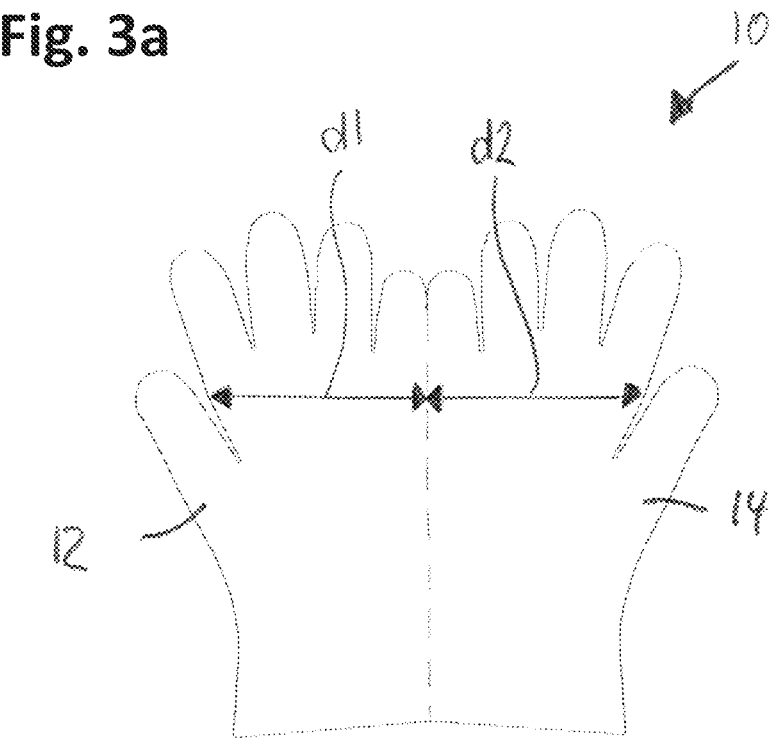
FIGS. 3a and 3b show an example for a first embodiment of a functional layer assembly having a flat configuration as prepared in step (A).
Figure 3B:
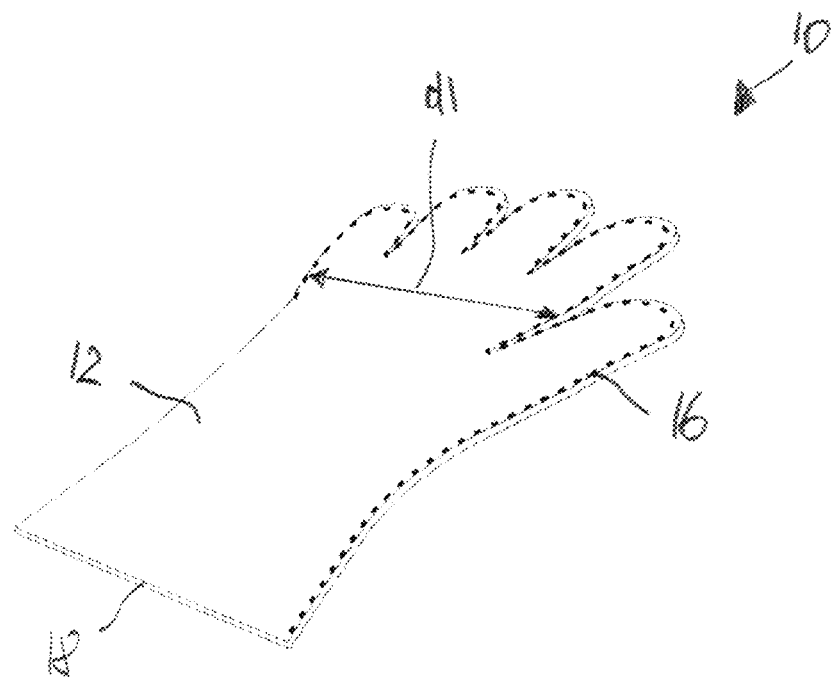

The flat backhand laminate was cut in the shape of the backhand portion and the palm portion of a finger glove as shown in FIG. 3a. The flat functional laminate was folded such the flat backhand portion and the flat palm portion were superimposed onto each other, and the flat backhand portion and the flat palm portion were joined to each other by a non stretchable stitched seam extending along the contour of the finger glove, as shown in FIG. 3b. Thereby a flat functional layer assembly was obtained.

The circumference of the flat functional layer assembly at a position in the middle hand region (20 mm below the roots of the fingers, corresponding to the mid between the roots of the index finger and the thumb) was 190 mm (backhand laminate: d1=95 mm, palm laminate: d2=95 mm).

The flat functional layer laminate was pulled on a handform, thereby stretching the functional layer assembly. The circumference of the handform at the same position in the middle hand region (20 mm below the roots of the fingers, corresponding to the mid between the roots of the index finger and the thumb) was d1+d2=230 mm. Therefore, by pulling on the handform the functional layer assembly was stretched to a deformation of (230 mm–190 mm)/190 mm×100=21% at the mentioned position in the middle hand region (20 mm below the roots of the fingers, corresponding to the mid between the roots of the index finger and the thumb).

Then, the functional layer assembly was put into a furnace (type: FED 240, as available from Binder GmbH, Tuttlingen, Germany). The furnace was pre-heated to a temperature of 180° C. The handform with the functional layer assembly was not pre-heated, but held at room temperature when being put into the furnace. The handform was held in the furnace for an exposure time of 120 seconds.

After lapse of the exposure time, the handform with the functional layer assembly was removed from the furnace and the functional layer assembly was pulled off the handform. To determine the remaining deformation of the functional layer assembly, the circumference of the functional layer assembly at the same position in the middle hand region (20 mm below the roots of the fingers, corresponding to the mid between the roots of the index finger and the thumb) was measured after the functional layer assembly had been pulled off the handform. The circumference of the functional layer assembly at the mentioned position in the middle hand region (20 mm below the roots of the fingers, corresponding to the mid between the roots of the index finger and the thumb) was measured to be d1+d2=220 mm. Therefore, the remaining deformation of the functional layer assembly at the mentioned position in the middle hand region (20 mm below the roots of the fingers, corresponding to the mid between the roots of the index finger and the thumb) was determined to be (220 mm–190 mm)/190 mm×100=16%. Relative remaining deformation was determined to be 16%/21%=76%. Thus, recovery was determined to be 100%–76%=24%.

After being subject to the stretching treatment and heat exposure treatment and being cooled to room temperature, s sample piece of the functional laminate was cut out from functional layer assembly and again subjected to a stress/strain measurement as specified DIN EN 14704-1 (2005). The test was carried out in the same way as described above. An elongation of 30% was measured for the functional laminate. Hence, a reduction in elongation of the functional laminate was measured after the laminate had been subject to the stretching treatment and heat exposure treatment with respect to the elongation of the functional laminate before being subject to the stretching and heat exposure treatment. This indicates that the laminate was still elastic, but at a reduced elasticity.

Tests and Definitions

Water Vapor Permeability (WVP) as used herein concerning the functional laminate, the functional layer assembly and therefore also the glove or glove lining is tested and defined in EN ISO 15496 (2004), also known as the "Cup Test". A 20×20 cm or Ø 100 mm sample of functional laminate is placed onto a container containing water and covered with a membrane. Then a cup containing potassium acetate and being covered by the same membrane is placed on the sample. Water vapor passes through the functional laminate into the cup, whose weight increase is then determined. The functional laminate, the functional layer assembly and therefore also the glove or glove lining are considered water vapor permeable or breathable if the WVP is greater than or equal to 0.01 g/(Pa*m²*h). If the required size of the sample cannot be obtained, a smaller sample may be used for the measurement using a smaller cup containing half the amount of potassium acetate specified in the Norm, i.e. 50 g instead of 100 g and mixed with 15.6 g of water.

Water Vapor Permeability or Breathability of the glove or glove lining can also be tested using the Whole Glove Breathability Test as disclosed in EP 0 396 716 assigned to W.L. Gore & Associates, Inc. The glove or glove lining is considered to be water vapour permeable as used herein at a measured Moisture Vapor transmission Rate (MVTR) of greater than or equal to 2 g/h at a water temperature of 35° C. and an ambient temperature of 23° C. and a relative humidity of 50%.

Windproofness is tested according to EN ISO 9237 (1995), at 100 Pa. A glove or glove lining according to the invention is considered windproof if air passes through the functional laminate at less than or equal to 10 l/m²/s, preferably less than or equal to 5 l/m²/s.

Waterproof as used herein for the glove or glove lining means that no water will pass through the glove from the inside to the outside, when tested by means of the "Water Test", also known as the "Leak Test". This consists of filling a glove with a large amount of water until at least all of the fingers are filled, and preferably up to the wrist, and waiting for 2 minutes to see if any bubbles or droplets form. If they do not, then the glove or glove lining is considered to be waterproof. The waterproofness of the glove or glove lining can also be measured using the 'Whole Glove Leak Tester" apparatus disclosed in U.S. Pat. No. 4,776,209 assigned to W. L. Gore & Associates, Inc., in which air at pressure of between 0.07 bar and 0.35 bar is admitted into the inside of a glove or glove lining disposed in a water tank.

Elongation of a sample piece of functional laminate may be tested in a strain/stress test as basically set out in DIN EN 14704-1 (2005). A sample piece of the laminate is prepared and clamped in the testing machine such that an area having a width of 25 mm in the machine direction of the laminate and a length of 50 mm in the cross direction is subjected to a stress/strain measurement as specified in DIN EN 14704-1 (2005). The test is done by carrying out three cycles of elongation up to a maximum tension of 3 N/cm, the first and second cycles followed by release of the tensioning force, respectively. At the third cycle, elongation is measured when the tensioning force reached 3 N/cm. At 3 N/cm, an elongation is measured, wherein elongation is defined as the ratio (expressed in percent) of the difference in length of the sample piece after being subject to the stress/strain measurement minus the length of the sample piece before being subject to the stress/strain measurement, the difference divided by the length of the sample piece before being subject to the stress/strain measurement.

The invention claimed is:

1. A glove comprising:
a functional layer assembly,
wherein the functional layer assembly comprises a first portion and a second portion superimposed on each other so as to define a shape of the glove,
wherein the first portion and the second portion are joined together by a seam so as to form a pocket having an insertion opening,
wherein the functional layer assembly has a structure such that when positioned on a user's hand, the functional layer assembly is configured to fit to a shape thereof, and such that, when removed from a user's hand, the functional layer assembly does not significantly recover to an original flat shape after removal from the user's hand, and
wherein at least one of the first portion and the second portion of the functional layer assembly comprises a functional laminate,
wherein the glove has stretch and recovery properties, and
wherein the glove is three-dimensional and water vapor permeable.

2. The glove of claim 1, wherein one of the first portion or the second portion have different sizes.

3. The glove of claim 1, wherein the first portion and the second portion each have a different stretchability.

4. The glove of claim 1, wherein the first and second portions are joined to each other only around their perimeters.

5. The glove of claim 1, wherein the functional laminate comprises a water vapor permeable film and at least one textile layer.

6. The glove of claim 1, wherein the functional laminate comprises 3-layer laminate comprising an outer textile layer, a functional layer, and a backer textile layer.

7. The glove of claim 1, wherein one of the first portion or the second portion are water vapor permeable.

8. The glove of claim 1, wherein the glove comprises structures for improving grip, for improving durability, and/or conductive structures.

9. The glove according to claim 1, wherein the seam extends from an inner side of the functional layer assembly to an outer side of the functional layer assembly.

10. The glove according to claim 1, wherein the seam is visible on an outer side of the functional layer assembly.

11. The glove according to claim 1, wherein the functional layer assembly comprises a first functional layer assembly forming the first portion and a second functional layer assembly forming the second portion.

12. The glove according to claim 1, wherein the functional layer assembly is at least one of windproof and waterproof.

13. The glove according to claim 1, wherein the functional layer assembly includes at least one stretchable textile layer.

14. The glove according to claim 13, wherein the at least one stretchable textile layer includes a stretchable fiber.

15. The glove according to claim 14, wherein the stretchable fiber comprises a polyurethane block copolymer, such as an elastane.

* * * * *